United States Patent [19]

Parsons

[11] Patent Number: 4,958,531
[45] Date of Patent: Sep. 25, 1990

[54] MECHANISM FOR TRANSMITTING ROTATIONAL MOTION FROM ONE SHAFT TO ANOTHER

[75] Inventor: Bryan N. V. Parsons, Stoney Stanton, England

[73] Assignee: Jaguar Cars Limited, England

[21] Appl. No.: 379,908

[22] Filed: Jul. 14, 1989

[30] Foreign Application Priority Data

Jul. 20, 1988 [GB] United Kingdom ............... 8817218

[51] Int. Cl.$^5$ ..................... F16H 37/06; F16H 21/12; F16H 1/32
[52] U.S. Cl. ........................................ 74/63; 74/567; 123/90.31; 475/174
[58] Field of Search ..................... 74/63, 68, 674, 804, 74/805, 567; 123/90.31; 475/174

[56] References Cited

U.S. PATENT DOCUMENTS

| | | | |
|---|---|---|---|
| 1,326,863 | 12/1919 | Heinkel | 74/63 X |
| 1,378,191 | 5/1921 | Pale | 74/63 |
| 2,522,735 | 9/1950 | Zagar | 74/63 |
| 4,328,715 | 5/1982 | Gorkov | 74/674 |
| 4,674,361 | 6/1987 | Parsons | 74/804 |

FOREIGN PATENT DOCUMENTS

| | | | |
|---|---|---|---|
| 12838/76 | 11/1978 | Australia. | |
| 2318760 | 12/1973 | Fed. Rep. of Germany. | |
| 534186 | 1/1922 | France | 123/90.31 |
| 2160612 | 12/1985 | United Kingdom. | |

*Primary Examiner*—Allan D. Herrmann
*Attorney, Agent, or Firm*—Davis, Bujold & Streck

[57] ABSTRACT

A mechanism for transmitting rotational motion from one shaft to another includes a link which is constrained to move in an orbital path, an input shaft is connected to the link so that rotation of the input shaft will cause the link to move in its orbital path and a second shaft parallel to the input shaft is connected to the link so that orbital motion of the link will cause the second shaft to rotate. At least one of the shafts is connected to the link by a mounting which is capable of movement in the plane of the link, said mounting making frictional engagement with the link so that when a lateral stress above a predetermined value is applied between the shaft and link, the mounting will move laterally to relieve the stress, said predetermined value being above the lateral stresses experienced during normal operation of the mechanism.

12 Claims, 3 Drawing Sheets

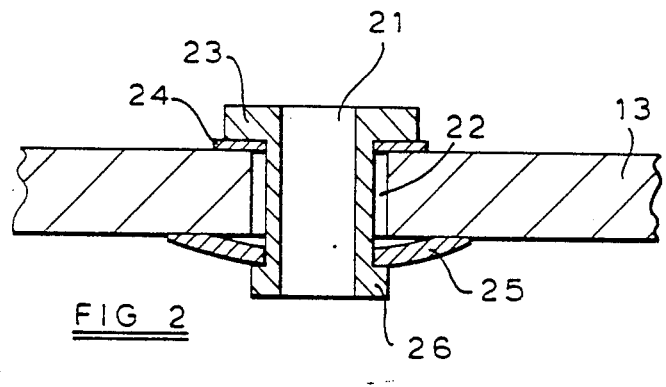
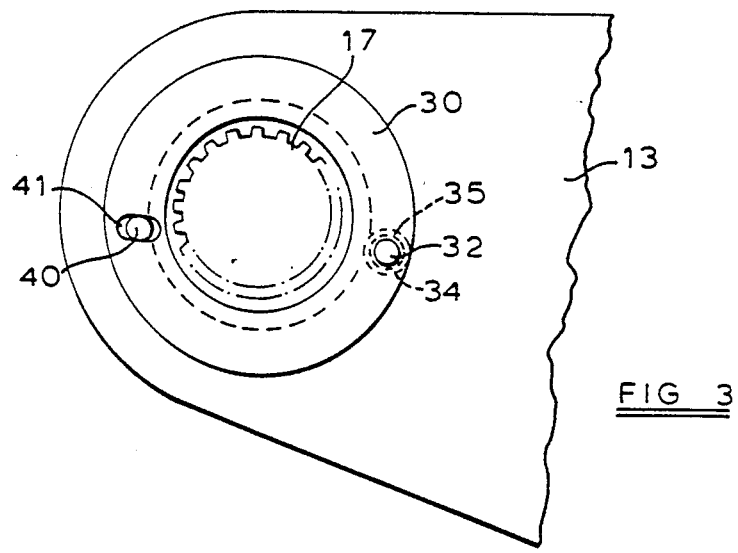

MECHANISM FOR TRANSMITTING ROTATIONAL MOTION FROM ONE SHAFT TO ANOTHER

BACKGROUND TO THE INVENTION

This invention relates to a mechanism for transmitting rotational motion from one shaft to another.

In accordance with UK Pat. No. GB 2,160,612B, a mechanism for transmitting rotational motion from one shaft to another shaft which is parallel to the first, comprises a link which is constrained to perform an orbital motion, the shafts being connected to the link by cranks or by internal/external gear sets.

If the tolerances of the above system are not accurately controlled, or if, for example, the tolerances do not accommodate thermal expansion of the link or other components, there is a danger that the drive could lock which could possibly result in shearing of the input shafts, stripping of gears, fracture of the link itself or damage to the mechanisms driven by the shafts.

SUMMARY OF THE INVENTION

According to one aspect of the present invention, a mechanism for transmitting rotational motion from one shaft to another comprises a link which is constrained to move in an orbital path, an input shaft being connected to the link so that rotation of the input shaft will cause the link to move in its orbital path and a second shaft parallel to said input shaft, said second shaft being connected to the link so that orbital motion of the link will cause the second shaft to rotate; at least one of said shafts being connected to the link by a mounting which is capable of movement in the plane of the link, said mounting making frictional engagement with the link so that when a lateral stress above a predetermined value is applied between the shaft and link, the mounting will move laterally to relieve the stress, said predetermined value being above the lateral stresses experienced during normal operation of the mechanism.

According to one preferred embodiment of the invention, one or both shafts are connected to the link by means of a crank. The crank on the end of the shaft engages in a bush which is located in an oversized aperture in the link. An external flange formation on one end of the bush bears against one face of the link while a Belleville washer is compressed between the other end of the bush and the other face of the link to apply a predetermined frictional load therebetween.

In a further preferred embodiment, one or both shafts may be connected to the link by means of gear sets, an external gear on the shaft engaging an internal gear on the link. With this construction, the internal gear may be mounted in an oversized aperture in the link and frictionally secured thereto in a manner similar to that described above. Alternatively, the gear may be located in a retaining plate, the gear locating in an oversized aperture in the link and the retaining plate being secured to the link by fastening means which extend through oversized holes in the retaining plate or link and apply a predetermined frictional load therebetween, so that the retaining plate and gear is capable of moving relative to the link when the lateral load between the shaft and link exceeds the predetermined frictional load.

Where the overloading of the connections between the shaft and link can be predicted to be in one direction, for example along the line joining the axes of the shafts when stressing is due to thermal expansion, the apertures in the link or retaining plate may be oversized in that direction only. Also, where an internal gear is mounted to the link by means of a retaining plate, the retaining plate may be pivotted about one point, so that movement of the retaining plate about the pivot will provide relief in the required direction. Alternatively, the retaining plate may be pivotted in an elongate hole so that pivotting of the retaining plate will give relief in one direction while the retaining plate is able to move lineally relative to the pivot to give relief in the other direction.

The present invention will provide a self centering effect, for example if on initial assembly there is sufficient mislaignment to generate transverse loads in excess of the predetermined value, one or more of the mountings will shift to relieve the stress after which the mechanism will continue to transmit drive normally.

The link may be constrained to perform orbital motion on one or more idler cranks, in which case, the idler cranks may also be connected to a link in the manner described above.

BRIEF DESCRIPTION OF THE DRAWINGS

An embodiment of the invention is now described, by way of example only, with reference to the accompanying drawings, in which:

FIG. 2 shows a section along the line II13 II of FIG. 1

FIG. 3 shows an alternative method of securing the internal gears of the embodiment illustrated in FIG. 1.

DESCRIPTION OF A PREFERRED EMBODIMENT

Figure 1:
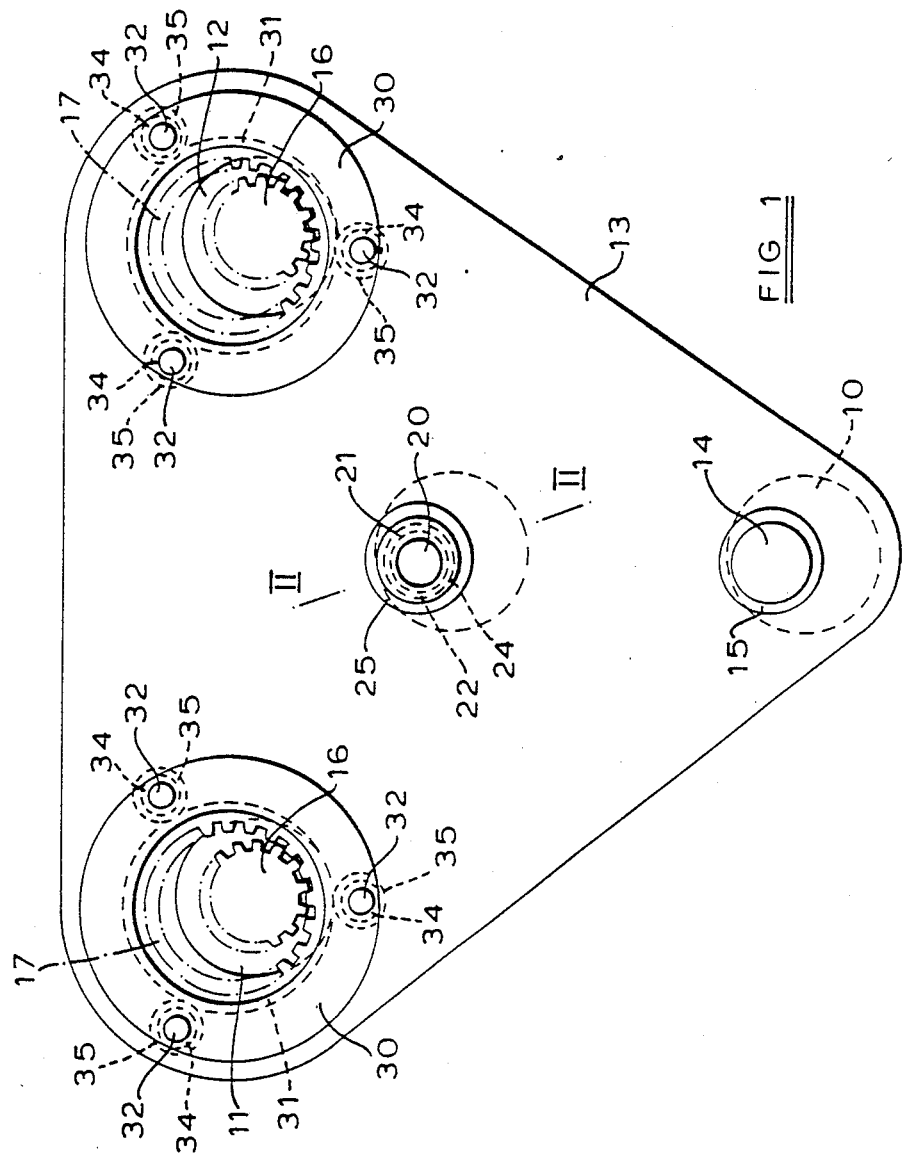
FIG. 1 illustrates a mechanism for transmitting rotational motion from one shaft to another in accordance with the present invention.
Figure 4:
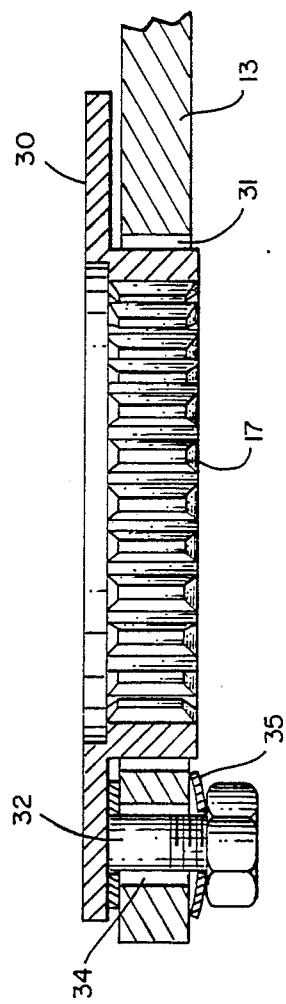
FIG. 4 is a partial cross-sectional view of the internal gear of the present invention.

FIG. 1 illustrates a mechanism for connecting the crankshaft 10 of an internal combustion engine to twin overhead cam shafts 11 and 12.

The crankshaft 10 is connected to a link 13 by means of crank 14 which engages in bearing 15 in the link 13. The cam shafts 11 and 12 are connected to the link 13 by means of external gears 16 which engage internal gears 17 mounted on the link 13. The gear sets 16, 17 give a two to one drive ratio so that the cam shafts 11 and 12 will be rotated at half the speed of the crankshaft 10.

An idler crank 20 is secured to the link 13 in order to stabilise the link 13 so that it will be driven by the crankshaft 10 in an orbital fashion.

As illustrated in greater detail in FIG. 2, the idler crank 20 is mounted to the link 13 in a bush 21 which is located in an oversized aperture 22 in the link 13. A flange portion 23 at one end of the bush 21 reacts against one face of the link 13 through a plane washer 24. A Belleville washer 25 is mounted on the other end 26 of bush 21 and engages the other face of the link 13, the end 26 of bush 21 being peined over so that a predetermined load is applied by the Belleville washer. Alternatively, the bush 21 may have an external screw thread so that the Belleville washer 25 may be retained thereon and adjusted to the appropriate load, by means of a nut.

The internal gears 17 are mounted in retaining plates 30 and are located in oversized apertures 31 in the link 13, the retaining plates 30 abutting one face of the link 13. The retaining plates 30 are secured to the link 13 by means of three angularly spaced rivets or screw fastening means 32. The rivets or screw fastening means 32 are located through oversized holes 34 in the link 13 and Belleville washer 35 are arranged to act against the other face of the link 13, in similar manner to the arrangement illustrated in FIG. 2.

The bush 21 and internal gears 17 are thus mounted on the link 13 in a manner which, if subjected to lateral loads in excess of the predetermined frictional load, will permit movement thereof to relieve the lateral loads and thus avoid damage to the mechanism.

In a modification illustrated in FIG. 3, the retaining plate 30 is secured to the link 13 by means of a pivot pin 40 which engages in an elongate hole 41 and by one rivet 32/Belleville washer 35 assembly as described above. With this arrangement, when subjected to lateral loads in excess of the predetermined frictional load, movement of the retaining plate 30 relative to the link 13 is permitted in one direction by pivotting of the retaining plate 30 about pin 40 and in the transverse direction by movement of the pin 40 longitudinally of the elongate hole 41.

Various embodiments may be made without departing from the invention. For example, the mechanism in accordance with the present invention may be used to transmit rotation between two or more shafts. Also, instead of using additional idler cranks to constrain the link to move in an orbital path, other means, for example an Oldham linkage, may be used for this purpose.

I claim:

1. A mechanism for transmitting rotational motion from one shaft to another comprising a link which is constrained to move in an orbital path, an input shaft being connected to the link so that rotation of the input shaft will cause the link to move in its orbital path and a second shaft parallel to said input shaft, said second shaft being connected to the link so that orbital motion of the link will cause the second shaft to rotate; at least one of said shafts being connected to the link by a mounting which is capable of movement in the plane of the link, said mounting making frictional engagement with the link so that when a lateral stress above a predetermined value is applied between the shaft and link, the mounting will move laterally to relieve the stress, said predetermined value being above the lateral stresses experienced during normal operation of the mechanism.

2. A mechanism according to claim 1 in which a shaft is connected to the link by means of a crank, said crank engaging in a bush which is located in an oversized aperture in the link, means being provided at one end of the bush to bear against one face of the link and means being provided at the other end of the bush to act against the other face of the link and apply a predetermined frictional load thereto.

3. A mechanism according to claim 1 in which an external gear is mounted on a shaft, said external gear engaging an internal gear mounted in an oversized aperture in the link, the internal gear being secured to the link in a manner which will permit relative movement thereof in the plane of the link, when subject to a lateral stress above a predetermined value.

4. A mechanism according to claim 3 in which means is provided at one end of the internal gear to bear against one face of the link and means acts between the other end of the internal gear and the other face of the link to apply a predetermined frictional load therebetween.

5. A mechanism according to claim 3 in which the internal gear is mounted on a retaining plate, the retaining plate being secured to the link by fastening means which extends through oversized holes in one of the retaining plate or link to apply a predetermined frictional load therebetween.

6. A mechanism according to claim 5 in which the retaining plate is secured to the link by means of a plurality of fastening means each extending through oversized holes in one of the retaining plate or link and applying a predetermined frictional load therebetween.

7. A mechanism according to claim 5 in which the retaining plate is pivotally attached to the link so that it may pivot relative to the link in one direction when a stress above a predetermined value is applied in that direction.

8. A mechanism according to claim 7 in which a pivot engages in an elongate hole in one of the retaining plate or the link so that the retaining plate may pivot relative to the link in one direction and the pivot may move lineally of the hole in the transverse direction.

9. A mechanism according to claim 1 in which a resilient load is applied between the shaft mounting and the link.

10. A mechanism according to claim 9 in which a Belleville washer acts between the shaft mounting and one face of the link.

11. A mechanism according to claim 10 in which screw means is provided to permit adjustment of the load applied by the Belleville washer.

12. A mechanism according to claim 1 in which the shaft mounting is located in an elongate hole in the link thereby permitting relative movement of the mounting in one direction in the plane of the link.

* * * * *